Patented Oct. 19, 1937

2,096,030

UNITED STATES PATENT OFFICE 2,096,030

ACID RESISTING VITREOUS ENAMELS

Raymond D. Cooke, Wauwatosa, Wis., assignor to Rundle Manufacturing Company, Milwaukee, Wis., a corporation of Wisconsin No Drawing. Application June 25, 1936, Serial No. 87,217

10 Claims. (Cl. 106—36.2)

This invention relates to improvements in the art of producing acid resisting vitreous enamels.

Since the advent of acid resisting vitreous enamels, which are commonly used for special purposes such as table tops, stove tops, refrigerator interiors, and cooking ware, it has been generally recognized that the application of these acid resisting enamels presents a unique difficulty not encountered when working with the ordinary non-acid resisting enamels.

In preparing the ordinary enamels of a non-acid resisting type for application to a surface, the common practice is to grind the frit in a ball mill with the addition of water and clay to form a fairly thick, stable suspension. Other materials are also added for other special purposes not related to the formation of a stable suspension. When the proper proportions of frit, clay and water are used, as for example, one hundred parts of frit, six parts of clay and forty parts of water, the colloidal properties of the clay are such as to cause the finely ground particles of frit to remain suspended indefinitely and to produce a workable slip. In producing an acid resisting enamel, it is found that the frit composition must be changed quite radically from that formerly used. When the prior grinding practice was resorted to, it was found that a workable slip did not result, inasmuch as the frit particles settled rapidly in spite of the presence of the clay. Heretofore, there have been many attempts to avoid this difficulty, and in some instances substances such as calcium chloride, alum, sodium aluminate, ammonium carbonate, and various acids were added to the mill mixture with only partial and varying degrees of success. The best results were obtained with the use of sodium aluminate, but even with this added substance, the results have not been entirely favorable and heretofore, those dealing with the application of acid resisting enamels, have always found that such enamels are considerably more difficult to apply, either by dipping or spraying, than the prior non-acid resisting enamels, and the same have required much more careful control and management during the applying steps.

It has long been recognized that the suspending properties of the clay are influenced by and in fact are completely dependent on, the presence of small amounts of various salts which the water dissolved from the surface of the ground frit. These salts, mainly alkaline in nature, serve to maintain the clay in flocculated state, and are therefore effective in suspending the frit. These salts have not been completely identified but are known to consist largely of sodium carbonate, sodium borate and sodium fluoride, with relatively minute amounts of sodium silicate. With respect to acid resisting enamels, it has been found that, while the afore-mentioned salts are in the solution in the water, the amount of sodium silicate is of a higher order of magnitude than in the common forms of non-acid resisting enamels, but it is nevertheless present in minute quantities. Sodium silicate is well known as a de-flocculating agent for clays, and this effect accounts for the fact that in acid resisting enamels, the suspending power of the clay is destroyed. The chemicals which were heretofore used to improve the suspension of acid resisting enamels, all had the effect, whether intentionally or not, of rendering the silicate insoluble and therefore harmless. Their only partial success lay in the fact that in introducing them, other soluble matter was put into the solution, which had the objectionable effects of reduction of gloss, promotion of tearing, and corrosive effects on the hands of the operators.

It is, therefore, a primary object of the present invention to provide a method of producing acid resisting vitreous enamels in which all of the prior difficulties are overcome and which permits the ready and efficient application of such enamels to surfaces.

A more specific object of the present invention is to provide a method, in connection with the preparation of acid resisting enamel slips, which will render the silicate insoluble without necessitating the addition of other salts to the solution.

Still another object of the invention is to provide a method of producing acid resisting vitreous enamel which is relatively inexpensive, which may be carried out expeditiously, and which is commercially practical and adapts itself to large scale production.

With the above and other objects in view, the invention consists of the improved method of producing acid resisting vitreous enamel, and all of its parts, combinations and steps as set forth in the claims, and all equivalents thereof.

A typical formula for the frit, which the present invention is not to be restricted to but which is given by way of illustration is as follows, the parts indicated being by weight. Forty-three parts of quartz; seventeen parts of borax; fifteen parts of soda ash; four parts of sodium nitrate; eight parts of sodium silico-fluoride; seven parts of titanium oxide and six parts of sodium antimonate. After these materials are mixed, they are subjected to heat and during the melting process some of the elements combine, and an action to be mentioned is that the soda ash combines with the quartz and one of the resulting products is sodium silicate. Thereupon the frit, clay, water and other ingredients are introduced into the mill.

As above mentioned, during the melting process a certain amount of sodium silicate is formed. A small part of the sodium silicate subsequently dissolves in the water of the slip. An important feature of the present invention resides in the introduction of carbon dioxide into the mill and it has been discovered that when the carbon dioxide is added, the sodium silicate, which has been dissolved by the water, is perhaps converted into insoluble silica and sodium carbonate. The latter product is harmless and in fact is definitely helpful when not excessive.

In carrying out the improved method of producing acid resisting vitreous enamels, there are a number of ways available, from a practical standpoint, for the introduction of the carbon dioxide. After the materials are in the mill, one successful way of providing the carbon dioxide content is to introduce solid carbon dioxide or dry ice into the mill just before it is closed for the milling operations. It has been found that the amount of carbon dioxide to be introduced should preferably be approximately one-half of 1% of the frit, or a trifle less, depending somewhat on the volume of the unoccupied space in the mill. After the introduction of the dry ice into the mill, and the closing of the mill, the mill is revolved in the ordinary manner, and the dry ice quickly evaporates and builds up a pressure of a few pounds per square inch within the mill. This insures complete saturation of the water during the grinding or milling operation.

An alternate method for introducing the carbon dioxide resides in providing the mill with a small opening fitted with a valve. After the mill has been closed, with the frit, clay, water and other essential ingredients therein, gaseous carbon dioxide from a pressure cylinder is allowed to flow into the mill until a suitable pressure has been built up. The valve is then closed and the milling operation commenced and saturation of the water will result.

It has also been found that the introduction of the carbon dioxide may be postponed until near the end of the milling operation, but better results have been obtained by introducing the carbon dioxide into the mill prior to the milling operations.

Analysis of the water content of enamel prepared according to the present method discloses that the soluble silica therein has been reduced to the same order of magnitude as occurs in non-acid resisting enamels. The enamel slip resulting from the process has all of the desirable properties of the ordinary non-acid resisting enamels, and these properties are retained permanently by the slip. Furthermore, the slip may be stored or kept for any reasonable period of time and in so doing, none of the desirable qualities are lost.

Various changes and modifications may be made in the method without departing from the spirit of the invention and all of such changes are contemplated as may come within the scope of the claims.

What is claimed as the invention is:

1. A vitreous enamel suspension including water which is saturated with carbon dioxide.

2. In the art of producing vitreous enamels, the steps of providing a suitable water suspension of the vitreous enamel, and then saturating the water thereof with carbon dioxide.

3. In the art of producing acid resisting vitreous enamel, the steps of providing a water suspension of the vitreous enamel, and then saturating the water thereof with carbon dioxide.

4. In the preparation of enamel, the steps consisting of providing a ceramic suspension in water, and then introducing carbon dioxide thereinto without the application of heat.

5. In the preparation of enamel, the steps consisting of providing a ceramic suspension in water, and then introducing carbon dioxide thereinto in such quantities and in such a manner as to saturate the water and subsequently render the suspension stable.

6. In the preparation of enamel, the steps consisting of providing a ceramic frit of vitreous materials, introducing said frit and water into a container for milling operations, then introducing carbon dioxide into the container, and finally subjecting the carbon dioxide to pressure to cause it to saturate the liquid content of the suspension.

7. In the preparation of enamel, the steps consisting of providing a ceramic frit of acid resisting, vitreous materials, introducing said frit and water into a container for milling operations, then introducing carbon dioxide into the container, and finally subjecting the carbon dioxide to pressure to cause it to saturate the liquid content of the suspension.

8. In the preparation of enamel, the steps consisting of providing a ceramic frit of acid resisting, vitreous materials, introducing said frit and water into a closed container, next inserting dry ice into the container, and finally subjecting the container and its contents to agitation.

9. In the preparation of enamel, the steps consisting of providing a ceramic frit of vitreous materials, introducing said frit and water into a container, and next introducing carbon dioxide into the container and its contents.

10. In the preparation of enamel, the steps consisting of providing an enamel slip in which a fusible, vitreous, insoluble, glass-like substance in finely divided form is suspended in water with sufficient clay therein to render the suspension stable, introducing said slip into a container for milling operations, then introducing carbon dioxide into the container, and finally subjecting the carbon dioxide to pressure to cause it to saturate the water content of the suspension.

RAYMOND D. COOKE.